United States Patent [19]
Bell, Jr. et al.

[11] 3,769,483
[45] Oct. 30, 1973

[54] POWER SUPPLY CIRCUIT AND METHOD OF ELECTRICAL DISCHARGE MACHINING

[75] Inventors: Oliver A. Bell, Jr., Mooresville; Thomas I. Prophet, Charlotte, both of N.C.

[73] Assignee: Colt Industries Operating Corp., New York, N.Y.

[22] Filed: May 25, 1972

[21] Appl. No.: 256,836

[52] U.S. Cl............................................. 219/69 C
[51] Int. Cl.............................................. B23p 1/08
[58] Field of Search......................... 219/69 C, 69 P

[56] References Cited
UNITED STATES PATENTS

| | | | |
|---|---|---|---|
| 3,020,448 | 2/1962 | Fefer | 219/69 P X |
| 3,246,113 | 4/1966 | Scarpelli | 219/69 C |
| 2,895,080 | 7/1959 | Branker | 219/69 P X |

Primary Examiner—R. F. Staubly
Attorney—Robert C. Hauke et al.

[57] ABSTRACT

A number of output electronic switches are included in the circuit, all having their principal or power conducting electrodes connected in parallel between a common terminal of a main machining power supply and the gap. A system is included for sequentially triggering the output switches into conduction and then repeating the process to provide a continuous train of machining power pulses to the gap. The system includes a set of "on" time control flip-flops arranged in shift register configuration and a corresponding set of "off" time control flip-flops likewise arranged in shift register configuration. The outputs from the "on" time control flip-flops are each connected to a different intermediate drive stage for providing the sequential time-spaced operation of each of the output switches.

4 Claims, 3 Drawing Figures

POWER SUPPLY CIRCUIT AND METHOD OF ELECTRICAL DISCHARGE MACHINING

BACKGROUND OF THE INVENTION

The present invention relates to an electrical discharge machining power supply circuit in which machining or material removal is accomplished by passing machining power pulses across a machining gap maintained between a tool electrode and a workpiece. The workpiece is of metal or of any material having electrical current conducting characteristic. A flow of dielectric fluid, such as kerosene, is maintained under pressure through the gap, both to provide a medium for dielectric breakdown and to remove from the gap the eroded particles from the electrode and the workpiece which might otherwise inhibit the process or cause gap short circuiting. The machining power pulses are precisely controlled with respect to their time duration and to the time period between pulses. For this purpose, it is common in modern electrical discharge machining power supplies to use a number of electronic output switches such as transistors or other solid state switches. While the preferred embodiment of this invention uses transistors, any electronic switch or switches may be substituted. By "electronic switch" is meant any electronic control device having a plurality of electrodes comprising at least two principal or power conducting electrodes being controlled by a control electrode within the switch whereby the conductivity between the principal power circuit is controlled statically or electrically without movement of mechanical elements within the switch.

In prior art systems, the switches are all turned on in unison to provide the desired current magnitude of machining pulses. The conduction of the switches is precisely controlled by a triggering means such as a multivibrator or the like. In machining power supply circuits, it is generally desirable to provide a broad range of available frequencies, which may range for example from approximately 500 Hz for roughing to as much as 500 KHz or even higher for finishing. Operation at the higher frequencies requires extremely rapid turn-on and turn-off of the output transistors. One approach in the design of electrical discharge machining power supply circuits has been to use a transistor bank of a relatively large number of transistors operated at drastically reduced current levels to reduce the possibility of their overheating with resultant failure. It has been found, however, that the reduction of the current has little effect when the output transistors are being operated at frequencies which are very high, for example, above the 100 KHz level. It has been learned that it is possible to connect a number of output transistors in the power supply circuit and to trigger them not in unison but sequentially so that the operating frequency is far lower for any individual transistor. Accordingly, the transistors may be operated at much higher peak currents. By way of example, in the present application, the six transistors connected in parallel as the output switches may safely provide only 5 amperes when operated in unison with each one operating at 500 KHz on a 50 percent duty factor. However, when each of the six output transistors is sequentially operated, the individual transistors will be operated at only 82.5 KC with an 8.25 percent duty factor. Accordingly, each transistor is capable of being run at the level of 35 amperes peak current or an average current of 17.5 amperes. These advantages are substantial with respect to the increased reliability and reduced cost of servicing of a power supply as will become apparent from the following specification.

SUMMARY OF THE PRESENT INVENTION

This application discloses a system in which a group of output transistors which are connected with the gap are sequentially operated. The triggering system for the group of transistors must be operated with great precision so that the resultant train of machining power pulses are of uniform power content and uniformly spaced. The inventive system involves a precise timing arrangement including integrated circuits of the digital type. A set of off-time control flip-flops and a corresponding set of on-time control flip-flops are included with a number of separate outputs including an intermediate drive stage for providing the sequential operation of each of the output transistors.

BRIEF DESCRIPTION OF THE DRAWINGS

A complete explanation of the present invention will be provided with refernece to the accompanying specification and to the several drawings in which like parts and terminals are identified with like numerals where they appear in the several views and wherein.

DESCRIPTION OF THE PREFERRED EMBODIMENT

Figure 1:
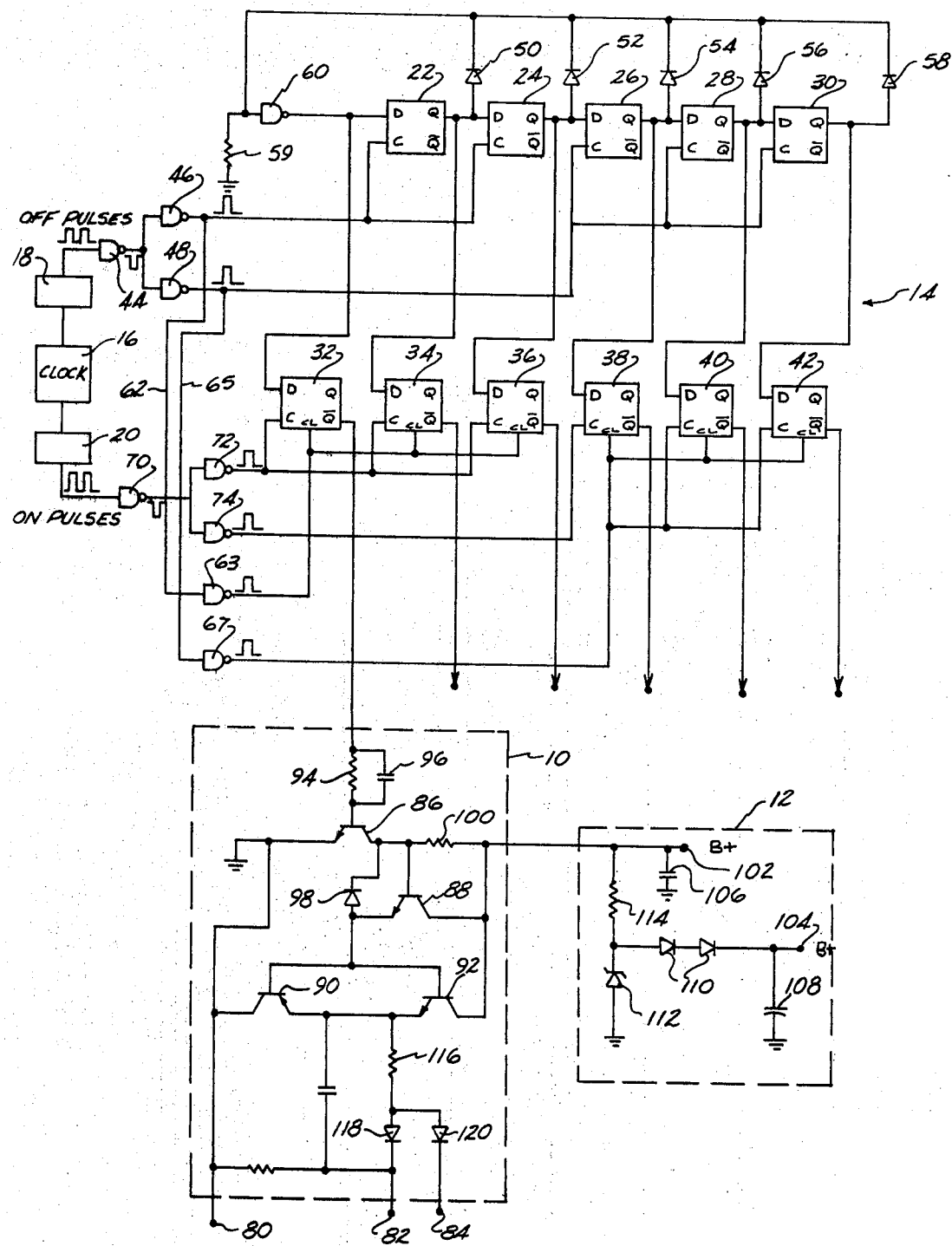
FIG. 1 is a combined schematic and logic diagram showing the on-off time control system used to provide a drive signal for each of the several drive stages.

FIG. 1 shows the logic control system for regulating the triggering of the several drive stages 10, one of which is shown in its entirety at the left side of the drawing. Also shown is a regulated DC supply 12 used to operate the drive stage 10. Included in the logic system is a shift register indicated generally by the numeral 14. The source of input pulses is indicated by a block diagram showing of a clock 16 having a dual pulse output provided to an off pulse one-shot multivibrator 18 and to an on pulse one-shot multivibrator 20. The basic elements of the control system and of the shift register 14 are a set of dual flip-flops 22, 24, 26, 28 and 30, all of which are operated by the off pulse inputs. A second set of dual flip-flops which are operated by the on pulse inputs are identified by the numerals 32, 34, 36, 38, 40 and 42. The system illustrated in this application is one in which there is included six output transistors, but the concept and teachings of the invention may be readily adapted to cover other multiples of output electronic switches.

The flip-flops used in the logic system of FIG. 1 are preferably of the digital integrated circuit type, such as, for example, the model designated dual D flip-flops DM 7474 which are a current commercial product of the National Semiconductor Corporation of Santa Clara, Calif. The several input and output terminals for each flip-flop are identified in the conventional fashion, with the data pulse input terminal identified by the letter D and the clock pulse input identified by the letter C. The output terminals Q or Q are also appropriately identified in both sets of flip-flops. It will be understood that the logical level applied to the data input D is transferred to the Q output when the clock voltage input rises to a logical 1 level. The lower set of flip-flops 32–42 will be seen to include a "clear" terminal identified in each case by the letters CL.

Included in the input stage for the system are input gates 44, 46 and 48 in the "off" pulse channel. A set of signal diodes 50, 52, 54, 56 and 58 are included in the circuit and associated with the upper set of flip-flops 22–30 as shown. A resistor 59 is connected to ground while a separate gate 60 has its output connected between the upper terminal of the resistor 59 and the data input terminal D of the first flip-flop 22. With reference to the "off" pulse channel, gate 46 has its output terminal connected to the clock input terminals C for flip-flops 22 and 24. The gate 48 has its output terminal connected to the clock input terminals C for the last three flip-flops 26, 28 and 30. A separate lead 62 and gate 63 are used to provide a pulse output to the clear terminal CL of the lower flip-flops 32, 34 and 36. The output from the gate 48 is connected through lead 65 and gate 67 to the clear input terminals CL for the flip-flops 38, 40 and 42.

In the "on" pulse channel there are included gates 70, 72 and 74, with the output from gate 72 providing clock pulses to flip-flops 32, 34 and 36. The gate 74 similarly provides clock pulses to flip-flops 38, 40 and 42. The triggering pulse output from the Q terminal of flip-flop 32 is used to provide a drive signal to the drive stage 10. The drive stage 10 includes several transistor stages to provide for the necessary shaping and amplification of the triggering signal which is finally passed to operate the uppermost transistor 130 of six output transistors, which will be shown hereinafter in FIG. 2. The output from the drive stage 10, taken from terminals 80, 82 and 84, is connected to the emitter, base and collector respectively of the transistor 130 of FIG. 2. Included in the drive stage 10 are a transistor 86, a driving transistor 88, and a current amplifier stage including push-pull connected transistors 90 and 92. Included in the base lead of the transistor 86 is a signal resistor 94 and a shunt capacitor 96. The output is taken from the collector of the transistor 86 to switch transistor 88. A diode 98 is connected across the base and emitter of the transistor 88. The separate regulated voltage supply 12 is connected to the collector of the drive transistor 86 through a resistor 100 and includes a B+ voltage connected at the terminal 102 and a lower magnitude B+ voltage connected at the terminal 104. Included in the circuit are condensers 106 and 108 with diodes 110 serially connected to the cathode of a regulator zener diode 112 and a resistor 114.

With further reference to the drive stage 10, the amplifier stage, including the transistors 90 and 92, is used as a current amplifier with the final control output through base connecting terminal 82 being passed through a series resistor 116 and a diode 118. The connection to the collector bus, as will be shown in FIG. 2, is through a series diode 121.

Figure 2:
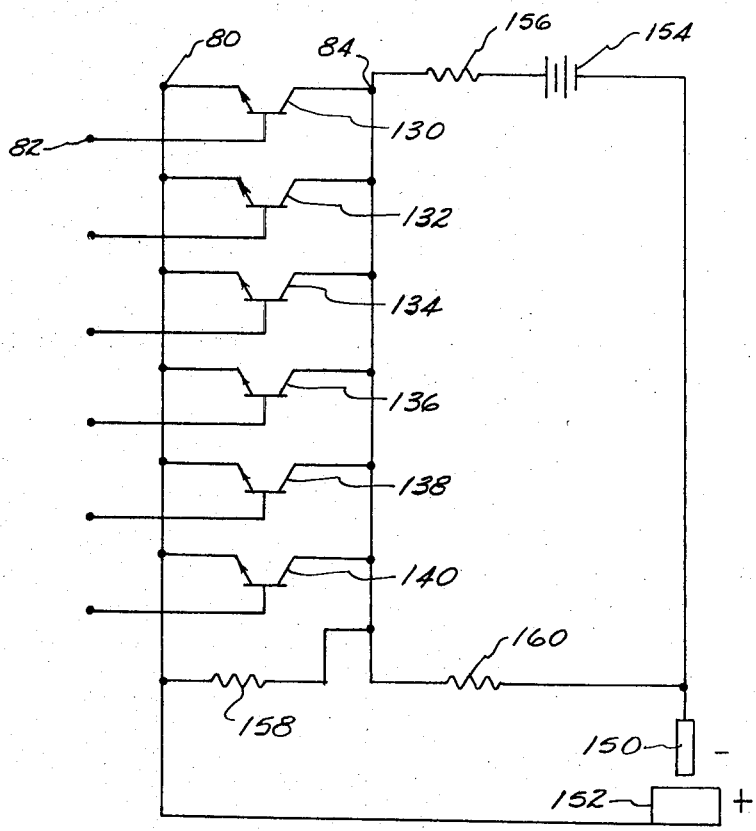
FIG. 2 is a schematic showing the bank of parallel coupled output transistors and their connection to the machining gap.

FIG. 2 shows the output stage of the electrical discharge machining power pulse supply, including the six parallel connected output transistors 130, 132, 134, 136, 138 and 140. The electrical machining gap includes a tool electrode 150 and an opposed workpiece 152. The polarity of the gap is standard with the electrode 150 negative and the workpiece 152 positive. A DC source 154 is used as the main machining power supply, while a series resistor 156 is connected between the positive terminal of the power supply 154 and the collector bus for the output transistor switches 130–140. A pair of resistors 158 and 160 are included in the machining power supply gap circuit as shown. Each of the output transistors 130–140 has its respective emitter, base and collector terminals corresponding to terminals 80, 82 and 84 as shown in FIG. 1 so that there is provided a separate drive stage coupled to each of the six flip-flops 32, 34, 36, 38, 40 and 42 from the logic control system.

Figure 3:
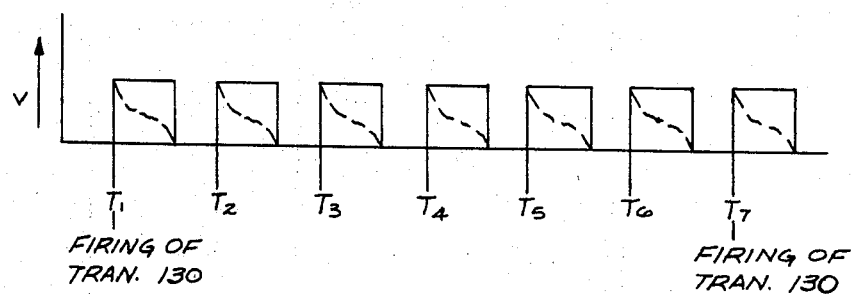
FIG. 3 is a gap voltage waveform illustrating the timing sequence of the several different output transistors.

FIG. 3 is a gap voltage diagram plotted against time which illustrates the sequential firing of the six output transistors 130–140. At time $T_1$, the transistor 130 is rendered conductive to provide the first of a train of six power pulses across the machining gap. At time $T_2$, the transistor 132 is rendered conductive to provide the second machining power pulse across the machining gap. At the following times $T_3$, $T_4$, $T_5$ and $T_6$, the next following four transistors, namely transistors 134–140, are turned on to continue the continuous train of machining power pulses. At time $T_7$, according to the control from the logic system of FIG. 2, the transistor 130 is again turned on thus starting the second sequence of six machining power pulses so that there is a continuous train of such pulses provided across the gap. It will be understood that the solid line rectangular machining power pulses shown in FIG. 3 represent open circuit pulses. While normal gap breakdowns occur, the gap voltage excursion will be substantially as shown in dash line configuration within each of the rectangular pulses.

DESCRIPTION OF OPERATION

Reference is now made to the FIG. 1 drawing. The continuous train of machining power pulses provided by the successive triggering into conduction of the output transistors 130–140 is initiated with the upper set of flip-flops, namely flip-flops 22–30, having a data pulse preset on the flip-flop 22 responsive to the last preceding operation of the right hand flip-flop 30, during which time the output pulse from its terminal Q was passed through the diode 58 to ground and at the same time to the gate 60 and to the data input terminal of the flip-flop 22 and to the data input of flip-flop 32. Pulses are provided from clock 16 through both the upper "off" pulse channel and the lower "on" pulse channel as illustrated. The first "on" pulse passed from the one-shot multivibrator 20 through gates 70, 72, and 74 is passed to transfer the data pulse already preset on the data input terminal of the flip-flop 32. The next "off" pulse clears the lower flip-flops 32–42 and then shifts the data pulse preset on the flip-flop 22 and transfers it to the data terminal of the flip-flop 24. At the same time, the "off" pulse transfers a data pulse to the lower flip-flop 34 in readiness for the next clock pulse to be provided by the next "on" time pulse. Each "on" time pulse transfers a triggering pulse successively from the Q terminals of the lower flip-flops 32–42 to their respective drive stage 10.

The triggering pulse is suitably amplified and passed through the several transistor stages of the drive stage 10 to provide a control output to switch the output transistor 130 into conduction to provide the first machining power pulse with reference to FIG. 3 which begins at time $T_1$. If the gap spacing is appropriate, there will be a breakdown of the dielectric coolant in the machining gap between the electrode 150 and the workpiece 152 to provide the erosive machining power pulse indicated in dash line in FIG. 3, thus to provide material removal. At this point, transistor 130 is switched open and each of the following output transistors 132, 134, 136, 138 and 140 is successively triggered into conduction by a like triggering output provided from the other five lower flip-flops 34, 36, 38, 40 and 42. In each case, the "on" pulse passed through the lower "on" pulse channel by the successive flip-flop stages is shifted rightwardly and then on to its respective drive stage and output transistor. The "off" pulse provided to the upper "off" pulse channel and through the flip-flops 22, 24, 26, 28 and 30 provides a shifting to the right and a clearing of each of the lower flip-flops to properly control the sequential firing of each of the output transistor switches.

Now with reference to the FIG. 3 drawing, it will be seen that each of the output switches is operated to provide pulses at one-sixth of the frequency of the total pulse train provided to the gap. At the end of the pulse provided at time $T_6$ by the conduction of the transistor 140, the sequence is repeated so that at time $T_7$ the transistor 130 is again rendered conductive and the entire cycle is repeated.

It will thus be seen that the present invention provides an improved apparatus and method for electrical discharge machining in which the output transistors are operable at exceedingly high frequencies in such manner as to virtually eliminate output transistor failure. The system for controlling the successive triggering of the output transistors comprises relatively low cost integrated circuit devices which are themselves reliable in operation.

What is claimed is:

1. In an electrical discharge machining power supply for removing material from an electrically conductive workpiece by a tool electrode spaced therefrom by a dielectric coolant filled gap, a power supply, a plurality of electronic output switches, each of said switches having its principal electrodes connected between a common terminal of said power supply and the gap, means for sequentially triggering the control electrodes of said output switches to render them conductive at regular time-spaced intervals to provide trains of machining power pulses across said gap, a means for regulating the uniform spacing of the output pulses from said triggering means to control conduction of said switches, said triggering means including a source of uniform on-time pulses, each of said on-time pulses separated from the other by a like time interval and said regulating means comprising an array of flip-flops connected in a shift register configuration for successively providing the triggering pulses to said plurality of electronic output switches.

2. In an electrical machining power supply for removing material from an electrically conductive workpiece by a tool electrode spaced therefrom by a dielectric coolant filled gap, a power supply, a plurality of electronic output switches, each of said switches having its principal electrodes connected between a common terminal of said power supply and the gap, means for sequentially triggering the control electrodes of said output switches to render them conductive for like time durations at regular timed spaced intervals thus to provide trains of machining power pulses across the gap, a like plurality of drive stages, each connected between said triggering means and a different one of said output switches for controlling its conduction, said triggering means comprising a pulse generator operable to provide separate control pulses for the operation of said drive stages, said pulse generator operable to provide separate "off" control pulses and separate "on" control pulses, and wherein a like plurality of dual flip-flops are coupled each to a different one of said drive stages which are sequentially operated for controlling their operation.

3. The combination as set forth in claim 2 wherein said pulse generator comprises a source of clock pulses and a pair of one-shot multivibrators for generating spaced "off" control and "on" control pulses to control the operation of said drive stages.

4. The combination as set forth in claim 3 wherein a shift register is coupled between the gated output from said one-shot multivibrators for successively transferring triggering pulses to said drive stages.

* * * * *

UNITED STATES PATENT OFFICE
CERTIFICATE OF CORRECTION

Patent No. 3,769,483　　　　　　　　　Dated October 30, 1973

Inventor(s) Oliver A. Bell, Jr. and Thomas I. Prophet

It is certified that error appears in the above-identified patent and that said Letters Patent are hereby corrected as shown below:

IN THE SPECIFICATION:

Col 2, line 23, correct spelling of "reference", line 67, "Q" (second occurrence) to be --$\bar{Q}$-- , Col. 3, line 29, "Q" to be --$\bar{Q}$-- , Col. 4, line 32, correct spelling of "configuration" , line 59, "Q" to be --$\bar{Q}$-- .

Signed and sealed this 12th day of March 1974.

(SEAL)
Attest:

EDWARD M. FLETCHER, JR.　　　　　C. MARSHALL DANN
Attesting Officer　　　　　　　　Commissioner of Patents